July 16, 1940. D. W. SHERMAN 2,207,831
BEARING
Filed April 26, 1939

Donald W. Sherman
INVENTOR.
BY
ATTORNEY.

Patented July 16, 1940

2,207,831

UNITED STATES PATENT OFFICE 2,207,831

BEARING

Donald W. Sherman, Shorewood, Wis., assignor to A. O. Smith Corporation, Milwaukee, Wis., a corporation of New York Application April 26, 1939, Serial No. 270,072

3 Claims. (Cl. 287—85)

This invention relates to a bearing and more particularly to a sheet metal bearing construction adapted to be employed with rubber bearing elements as used in bearings in control arms, drag links and tie rods of present day automobiles.

The principal objects of the invention are to more nearly center the bearing load relative to the web of the sheet metal part surrounding the bearing, to reenforce and extend the bearing sleeve, and to provide a more economical structure which will result in a considerable saving in cost.

Other objects will appear hereinafter in connection with the description and illustration of an embodiment of the invention.

Figure 1:
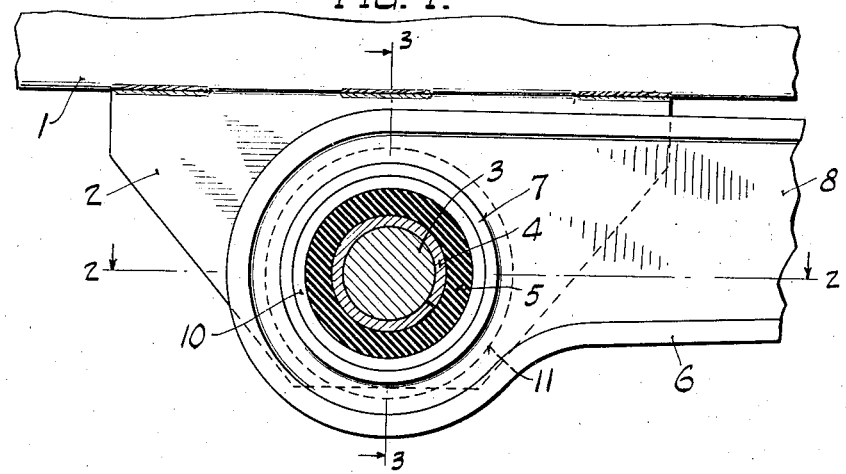
Figure 1 is a transverse section through the bearing taken on line 1—1 of Fig. 3.
Figure 2:
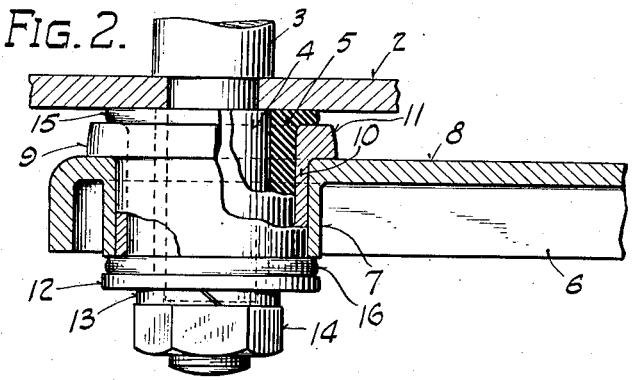
Fig. 2 is a side view with parts broken away and sectioned on line 2—2 of Fig. 1 to illustrate the construction.
Figure 3:
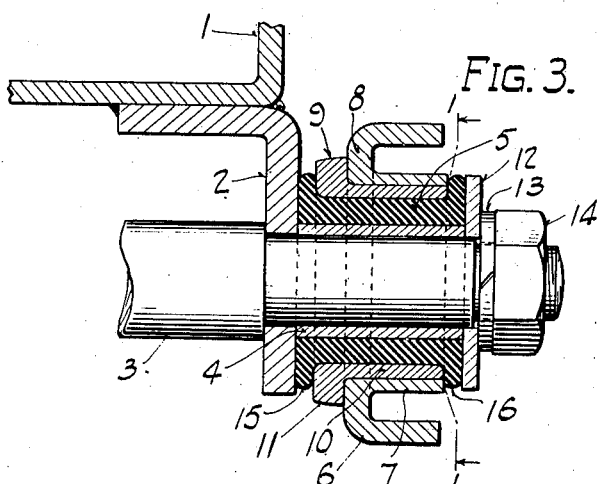
Fig. 3 is a vertical longitudinal section taken on line 3—3 of Fig. 1.

The bearing is illustrated in a control arm in which the central stationary frame member 1 has a depending bracket 2 secured thereto. A shaft 3 extends through two of such brackets and serves to bolt a bearing to each.

On the end of the shaft 3 is a cylindrical sleeve 4 surrounded by a tubular rubber bearing element 5 which is spool shaped.

The control arm is formed from sheet metal as illustrated in my United States Letters Patent No. 2,148,177 and the end of the channel member 6 has an opening which is flanged as at 7, preferably by the process set forth in my co-pending application Serial No. 189,925, filed February 11, 1938, Patent No. 2,157,354, May 9, 1939, for Embossing metal plates.

If the flange 7 were to be inserted over the rubber bearing element 5, due to the resilience of the rubber the flange would be loaded off center from the web 8 of member 6 and would also be weak due to its thinness and lack of reenforcement.

The present invention provides a bearing sleeve 9 between the flange 7 and the rubber element 5. The sleeve 9 may be constructed very economically from plate stock by the process set forth in the co-pending application above referred to, to provide a flange 10 which fits tightly (preferably by a drive fit) into the flange 7 and which tightly presses against the rubber element 5. The sleeve 9 is inserted in the opening of member 6 so that the plate 11 of the sleeve engages the side of the web 8 and the flange 10 extends for the full length of flange 7 to reenforce it. The thickness of the member 11 is such that the inner cylindrical surface for receiving the rubber element 5 is nearly centered on the web 8. This provides a stronger bearing and prevents tendency for deflection of the member 6.

The structure is held on the shaft 3 by a washer plate 12, lock washer 13 and nut 14. The end flange 15 on the rubber bearing element 5 is held between the bracket 2 and plate 11, and the corresponding flange 16 is held between the ends of the flanges 7 and 10 and the washer plate 12. The flanges 15 and 16 serve to separate the two members joined by the bearing and to position the parts relatively.

Various embodiments may be employed within the scope of the invention.

The invention is claimed as follows:

1. A bearing comprising a sheet metal element having an opening and an integral laterally extending tubular flange bounding the opening for receiving a bearing, a plate metal bearing sleeve having a similar opening and integral flange, said sleeve being tight in the opening in said element and having its plate stock engaging the web of said element and its flange extending to the end of the flange on said element to reenforce the same, and a bearing secured in said sleeve and having its transverse central plane lying close to the plane of the web of said element.

2. A bearing comprising an element having an opening provided with an integral tubular flange extending to one side thereof, and a bearing sleeve of plate stock and having a tubular flange fitting tightly in the flange of said element with the plate stock of the sleeve engaging one side of the web of the element and the flanges extending coextensively on the other side of said web.

3. In a bearing comprising a link constituting one element of the bearing, a rubber bearing member, and a member secured in the rubber bearing member and constituting the other element of the bearing, the improvement comprising constructing the link with an opening provided with an integral tubular flange extending to one side thereof, and a tubular bearing sleeve of plate stock and having a tubular flange fitting tightly in the flange of the link with the plate stock of the sleeve engaging one side of the web of the element and the flanges extending coextensively on the other side of said web to center the rubber bearing member relative to the web of the link.

DONALD W. SHERMAN.